United States Patent
Noh

(10) Patent No.: US 12,221,156 B2
(45) Date of Patent: Feb. 11, 2025

(54) VEHICLE PARKING CONTROL DEVICE AND METHOD THEREFOR

(71) Applicants: Hyundai Motor Company, Seoul (KR); Kia Corporation, Seoul (KR)

(72) Inventor: Seung Hun Noh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 220 days.

(21) Appl. No.: 17/978,753

(22) Filed: Nov. 1, 2022

(65) Prior Publication Data

US 2023/0339467 A1    Oct. 26, 2023

(30) Foreign Application Priority Data

Apr. 22, 2022    (KR) .................. 10-2022-0050245

(51) Int. Cl.
*B62D 15/02* (2006.01)
*B60W 30/06* (2006.01)
*B60W 30/18* (2012.01)

(52) U.S. Cl.
CPC ......... *B62D 15/0285* (2013.01); *B60W 30/06* (2013.01); *B60W 30/18018* (2013.01); *B60W 30/18054* (2013.01); *B60T 2201/10* (2013.01); *B60W 2420/403* (2013.01); *B60W 2420/408* (2024.01); *B60W 2510/1005* (2013.01); *B60W 2510/20* (2013.01); *B60W 2540/12* (2013.01); *B60W 2540/225* (2020.02); *B60W 2552/53* (2020.02); *B60W 2554/404* (2020.02)

(58) Field of Classification Search
None
See application file for complete search history.

(56) References Cited

U.S. PATENT DOCUMENTS

| | | | |
|---|---|---|---|
| 9,758,092 B2 * | 9/2017 | Pal | ........................ G08G 1/163 |
| 10,062,289 B2 * | 8/2018 | Arndt | ............... G08G 1/096811 |
| 10,093,223 B2 * | 10/2018 | Pal | ........................ G08G 1/163 |
| 10,137,888 B2 * | 11/2018 | Seo | ......................... B62D 1/00 |
| 10,407,068 B2 | 9/2019 | Goh | |

(Continued)

FOREIGN PATENT DOCUMENTS

| | | | | |
|---|---|---|---|---|
| CN | 108238030 B | 11/2019 | | |
| CN | 110466504 A | * 11/2019 | ............ B60W 30/06 |

(Continued)

*Primary Examiner* — Kevin R Steckbauer
(74) *Attorney, Agent, or Firm* — Morgan, Lewis & Bockius LLP

(57) ABSTRACT

A vehicle parking control device includes a data collection module that collects vehicle data, and at least one processor electrically connected to the data collection module, wherein the at least one processor may obtain the vehicle data through the data collection module, determine whether a vehicle satisfies a first parking condition based on location information of the vehicle included in the vehicle data, determine whether the vehicle satisfies a second parking condition, based on state information of the vehicle included in the vehicle data when the vehicle satisfies the first parking condition, activate a parking mode when the vehicle satisfies the second parking condition, and control the vehicle according to the parking mode. It is possible to prevent accidents and enhance the driver's convenience by controlling the behavior of the vehicle during parking.

18 Claims, 17 Drawing Sheets

(56) References Cited

U.S. PATENT DOCUMENTS

| | | | |
|---|---|---|---|
| 10,606,272 B2* | 3/2020 | Seo | G05D 1/021 |
| 11,377,096 B2* | 7/2022 | Fan | G08G 1/145 |
| 11,724,741 B2* | 8/2023 | Lee | G08G 1/143 |
| | | | 701/428 |
| 11,760,341 B2* | 9/2023 | Lee | G06V 20/597 |
| | | | 340/932.2 |
| 2014/0309834 A1* | 10/2014 | Choi | B62D 15/0285 |
| | | | 701/23 |
| 2016/0371982 A1* | 12/2016 | Arndt | G08G 1/096844 |
| 2017/0166115 A1* | 6/2017 | Pal | B60Q 5/005 |
| 2017/0355301 A1* | 12/2017 | Pal | B60Q 5/005 |
| 2018/0022345 A1* | 1/2018 | Seo | B62D 15/027 |
| | | | 701/2 |
| 2018/0024559 A1* | 1/2018 | Seo | G08G 1/144 |
| | | | 701/23 |
| 2018/0141556 A1 | 5/2018 | Goh | |
| 2019/0009713 A1* | 1/2019 | Pal | G08G 1/149 |
| 2021/0229743 A1* | 7/2021 | Lee | G01C 21/3697 |
| 2021/0323537 A1* | 10/2021 | Fan | H04N 7/18 |
| 2022/0203968 A1* | 6/2022 | Nakagawa | B60W 10/18 |
| 2022/0363290 A1* | 11/2022 | Li | B62D 15/0285 |
| 2022/0371578 A1* | 11/2022 | Lee | B62D 15/0285 |
| 2023/0060130 A1* | 3/2023 | Sannodo | B60W 10/184 |
| 2023/0339467 A1* | 10/2023 | Noh | B62D 15/0285 |

FOREIGN PATENT DOCUMENTS

| | | | | |
|---|---|---|---|---|
| CN | 110239510 B | * | 5/2021 | B60W 10/08 |
| CN | 114670793 A | * | 6/2022 | |
| CN | 110466504 B | * | 8/2022 | B60W 30/06 |
| CN | 114291075 B | * | 8/2023 | |
| CN | 116923406 A | * | 10/2023 | B60W 30/18018 |
| DE | 102013216455 A1 | * | 10/2014 | B62D 15/0285 |
| DE | 102016220019 A1 | * | 1/2018 | B60R 25/10 |
| DE | 102021213203 A1 | * | 11/2022 | B60W 30/06 |
| KR | 10-1417864 B | | 7/2014 | |
| KR | 10-2018-0057148 A | | 5/2018 | |

* cited by examiner

VEHICLE PARKING CONTROL DEVICE AND METHOD THEREFOR

CROSS-REFERENCE TO RELATED APPLICATION

The present application claims priority to Korean Patent Application No. 10-2022-0050245, filed on Apr. 22, 2022, the entire contents of which is incorporated herein for all purposes by this reference.

BACKGROUND OF THE PRESENT DISCLOSURE

Field of the Present Disclosure

The present disclosure relates to a vehicle parking control device and method, and more particularly, to a technology for controlling a vehicle according to a driver's intention during parking.

Description of Related Art

A driver has to keep pressing a brake pedal while a vehicle is being driven, for example, when the vehicle is in a long stop state or is waiting for a signal, causing increase in the driver's fatigue.

To solve the present inconvenience, an automatic vehicle hold (AVH) is applied to a vehicle. The automatic vehicle hold function is one of the driver convenience devices capable of causing a vehicle to be in a stopped state even when a driver takes a foot off a brake pedal after the driver presses a brake pedal and then stops the vehicle while a gear shifter is in a D/R/N gear.

The automatic vehicle hold function is released and the vehicle starts to move when the driver steps on an accelerator pedal in the D/R gear after the vehicle is stopped by the automatic vehicle hold function.

As described above, in general, the vehicle releases the automatic vehicle hold function through operation of an accelerator or brake pedal or determination of a brake hydraulic condition, or automatically maintains a braking force while the vehicle is stopped when there is a request to activate the automatic vehicle hold function by another device.

However, there may be a problem in that the vehicle is controlled differently from the intention of the driver due to unnecessary intervention of the vehicle such as activation of an automatic vehicle hold function or an idle stop and go (ISG) function during parking.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle parking control device and method for preventing an accident caused by a driver's malfunction in a specific situation.

Another aspect of the present disclosure provides provide a vehicle parking control device and method for minimizing inconvenience to a driver due to unnecessary intervention of a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle parking control device includes a data collection module that collects vehicle data, and at least one processor electrically connected to the data collection module, wherein the at least one processor may obtain the vehicle data through the data collection module, determine whether a vehicle satisfies a first parking condition based on location information of the vehicle included in the vehicle data, determine whether the vehicle satisfies a second parking condition, based on state information of the vehicle included in the vehicle data when the vehicle satisfies the first parking condition, activate a parking mode when the vehicle satisfies the second parking condition, and control the vehicle according to the parking mode.

According to an exemplary embodiment of the present disclosure, the data collection module may include at least one of a global positioning system (GPS), a front camera, a driver state warning (DSW) camera, a radar, a steering angle sensor, a gear shifting sensor, or a brake pedal sensor.

According to an exemplary embodiment of the present disclosure, the at least one processor may, in response to determining that the vehicle is entering a parking lot or the vehicle is located in the parking lot based on the location information of the vehicle, identify at least one of at least one other vehicle parked nearby or a parking line and determine that the first parking condition is satisfied when the at least one of the at least one other vehicle or the parking line is identified.

According to an exemplary embodiment of the present disclosure, the at least one processor may, in response to determining that the vehicle is located near an on-street parking lot based on the location information of the vehicle, identify at least one of at least one other vehicle parked nearby, a parking line, or a moving state of a nearby vehicle, and determine that the first parking condition is satisfied when at least one of the at least one other vehicle or the parking line is identified and it is determined that a moving state of the nearby vehicle is similar to a moving state of the vehicle.

According to an exemplary embodiment of the present disclosure, the state information of the vehicle may include at least one of a steering angle sensor value or a brake sensor value collected by the data collection module, and the at least one processor is configured to conclude that the vehicle satisfies the second parking condition when the steering angle sensor value is greater than a first threshold value or when the brake sensor value is greater than a second threshold value while the vehicle satisfies the first parking condition.

According to an exemplary embodiment of the present disclosure, the data collection module may include a gear shifting sensor and a camera, and the at least one processor may, after the parking mode is activated, obtain driver gaze information through the camera, obtain gear shifting information from the gear shifting sensor, and control the vehicle according to the parking mode based on the driver gaze information and the gear shifting information.

According to an exemplary embodiment of the present disclosure, the at least one processor may shift a gear to a neutral (N) position when the at least one processor concludes that a driver's gaze direction is a forward direction and the gear is set in succession to a reverse (R) position based on the driver gaze information and the gear shifting information.

According to an exemplary embodiment of the present disclosure, the at least one processor may shift a gear to a neutral (N) position when the at least one processor concludes that a driver's gaze direction is a rearward direction and the gear is set in succession to a drive (D) position based on the driver gaze information and the gear shifting information.

According to an exemplary embodiment of the present disclosure, the state information of the vehicle may include at least one of a steering angle sensor value, a brake sensor value or a gear shifting information collected by the data collection module, and the at least one processor is configured to conclude that the second parking condition is identified when the steering angle sensor value is greater than a first threshold value, when the brake sensor value is greater than a second threshold value, or when it is determined that a gear shifter position is changed based on the gear shifting information.

According to an exemplary embodiment of the present disclosure, the at least one processor may automatically release an auto vehicle hold (AVH) function or an idle stop and go (ISG) function according to the parking mode in response to the parking mode being activated when it is determined that the vehicle satisfies the second parking condition.

According to an aspect of the present disclosure, a vehicle parking control method includes obtaining, by at least one processor, vehicle data through a data collection module, determining, by the at least one processor, whether a vehicle satisfies a first parking condition based on location information of the vehicle included in the vehicle data, determining, by the at least one processor, whether the vehicle satisfies a second parking condition, based on state information of the vehicle included in the vehicle data when the vehicle satisfies the first parking condition, activating, by the at least one processor, a parking mode when the vehicle satisfies the second parking condition, and controlling, by the at least one processor, the vehicle according to the parking mode.

According to an exemplary embodiment of the present disclosure, the data collection module may include at least one of a global positioning system (GPS), a front camera, a driver state warning (DSW) camera, a radar, a steering angle sensor, a gear shifting sensor, or a brake pedal sensor.

According to an exemplary embodiment of the present disclosure, the determining of whether the vehicle satisfies the first parking condition may include identifying, by the at least one processor, at least one of at least one other vehicle or a parking line in response to determining that the vehicle is entering a parking lot or the vehicle is located in the parking lot, based on location information of the vehicle, and determining that the first parking condition is satisfied when at least one of the at least one other vehicle or the parking line is identified.

According to an exemplary embodiment of the present disclosure, the determining of whether the vehicle satisfies the first parking condition may include identifying at least one of at least one other vehicle parked nearby, a parking line, or a moving state of a nearby vehicle, in response to determining that the vehicle is located near an on-street parking lot based on the location information of the vehicle, and concluding that the first parking condition is satisfied when at least one of the at least one other vehicle or the parking line is identified and that a moving state of the nearby vehicle is similar to a moving state of the vehicle.

According to an exemplary embodiment of the present disclosure, the state information of the vehicle may include at least one of a steering angle sensor value or a brake sensor value collected by the data collection module, and the determining of whether the vehicle satisfies the second parking condition may include determining, by the at least one processor, that the vehicle satisfies the second parking condition when the steering angle sensor value is greater than a first threshold value or when the brake sensor value is greater than a second threshold value while the vehicle satisfies the first parking condition.

According to an exemplary embodiment of the present disclosure, the vehicle parking control method may further include obtaining, by the at least one processor, driver gaze information through a camera after the parking mode is activated, obtaining gear shifting information from a gear shifting sensor, and controlling the vehicle according to the parking mode based on the driver gaze information and the gear shifting information.

According to an exemplary embodiment of the present disclosure, the controlling of the vehicle according to the parking mode may include shifting, by the at least one processor, a gear to a neutral (N) position when the at least one processor concludes that a driver's gaze direction is a forward direction and the gear is set in succession to a reverse (R) position based on the driver gaze information and the gear shifting information.

According to an exemplary embodiment of the present disclosure, the controlling of the vehicle according to the parking mode may include shifting, by the at least one processor, a gear to a neutral (N) position when the at least one processor concludes that a driver's gaze direction is a rearward direction and the gear is set in succession to a drive (D) position based on the driver gaze information and the gear shifting information.

According to an exemplary embodiment of the present disclosure, the state information of the vehicle may include at least one of a steering angle sensor value, a brake sensor value or a gear shifting information collected by the data collection module, and the determining of whether the vehicle satisfies the second parking condition may include determining, by the at least one processor, that the second parking condition is identified when the steering angle sensor value is greater than a first threshold value, when the brake sensor value is greater than a second threshold value, or when it is determined that a gear shifter position is changed based on the gear shifting information.

According to an exemplary embodiment of the present disclosure, the controlling of the vehicle according to the parking mode may include automatically releasing, by the at least one processor, an auto vehicle hold (AVH) function or an idle stop and go (ISG) function according to the parking mode in response to the parking mode being activated when it is determined that the vehicle satisfies the second parking condition.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
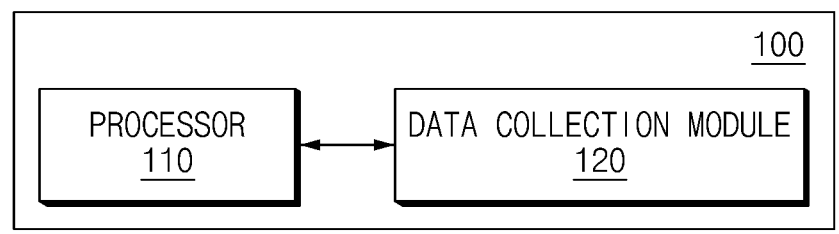
FIG. 1 is a flowchart illustrating a vehicle parking control device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 12.

FIG. 1 is a block diagram showing a vehicle parking control device according to an exemplary embodiment of the present disclosure. Below, in the present specification, a vehicle parking control device 100 may be referred to as the parking control device 100.

Referring to FIG. 1, the parking control device 100 according to an exemplary embodiment of the present disclosure may include a processor 110 and a data collection module 120. In various exemplary embodiments of the present disclosure, the parking control device 100 may include additional components in addition to the components illustrated in FIG. 1, or may omit at least one of the components illustrated in FIG. 1.

According to an exemplary embodiment of the present disclosure, the processor 110 may be electrically connected to the data collection module 120 and may electrically control each of components. The processor 110 may be electrical circuits which execute instructions of software and therefore, perform various data processing and calculation, which will be described below.

The processor 110 may include, for example, an electronic control unit (ECU), a micro controller unit (MCU), or other sub-controller mounted in a vehicle.

Specific details related to the operation of the processor 110 will be described later with reference to FIGS. 2 and 4.

According to an exemplary embodiment of the present disclosure, the data collection module 120 may collect various data (e.g., vehicle data) required when the vehicle is parked or driven.

According to an exemplary embodiment of the present disclosure, the data collection module 120 may collect various data from a global positioning system (GPS), a front camera, a driver state warning (DSW) camera, a radar, a steering angle sensor, a gear shifting sensor, a brake pedal sensor, a laser scanner, a navigation system with a precise parking lot map, an inertial measurement unit (IMU), an around view monitoring (AVM) system, an ultrasonic sensor, a wheel speed sensor, electronic control units (ECU), an engine management system (EMS), an electronic stability control (ESC) system, an electric parking brake (EPB) system, a motor driven power steering (MDPS) system, an electronic shifter (E-shifter), or the like.

According to an exemplary embodiment of the present disclosure, the data collection module 120 may collect various data from ECUs, an EMS, an ESC system, an EPB system, an MDPS system, or an E-shifter, through a vehicle network. Herein, the vehicle network may include a controller area network (CAN), a local interconnect network (LIN), a FlexRay, a media oriented system transport (MOST), and the like.

Figure 2:
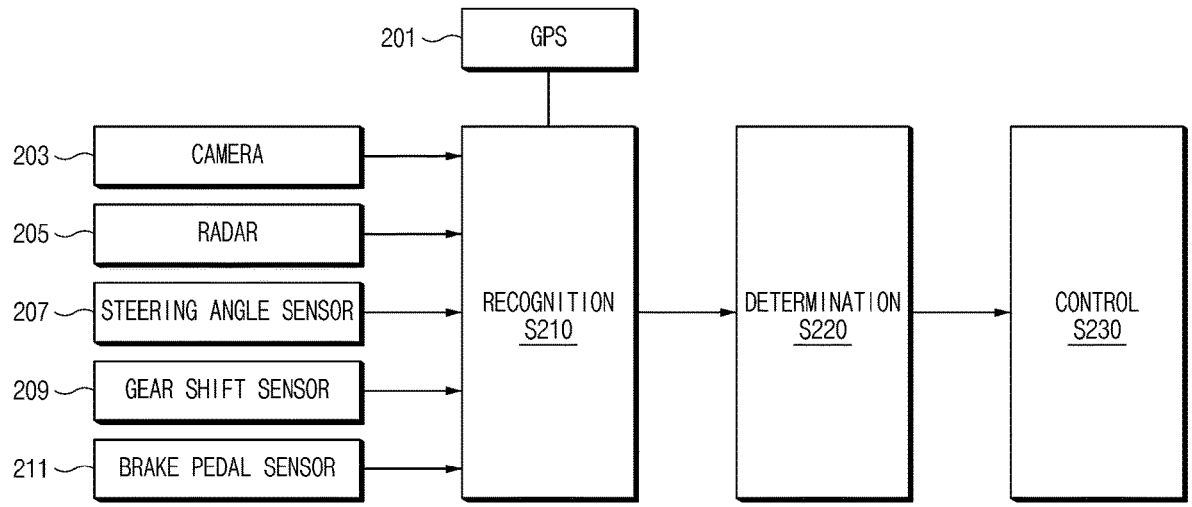
FIG. 2 is a diagram illustrating a method of collecting data and controlling a vehicle during parking in a vehicle parking control device and method according to an exemplary embodiment of the present disclosure.
Figure 2:
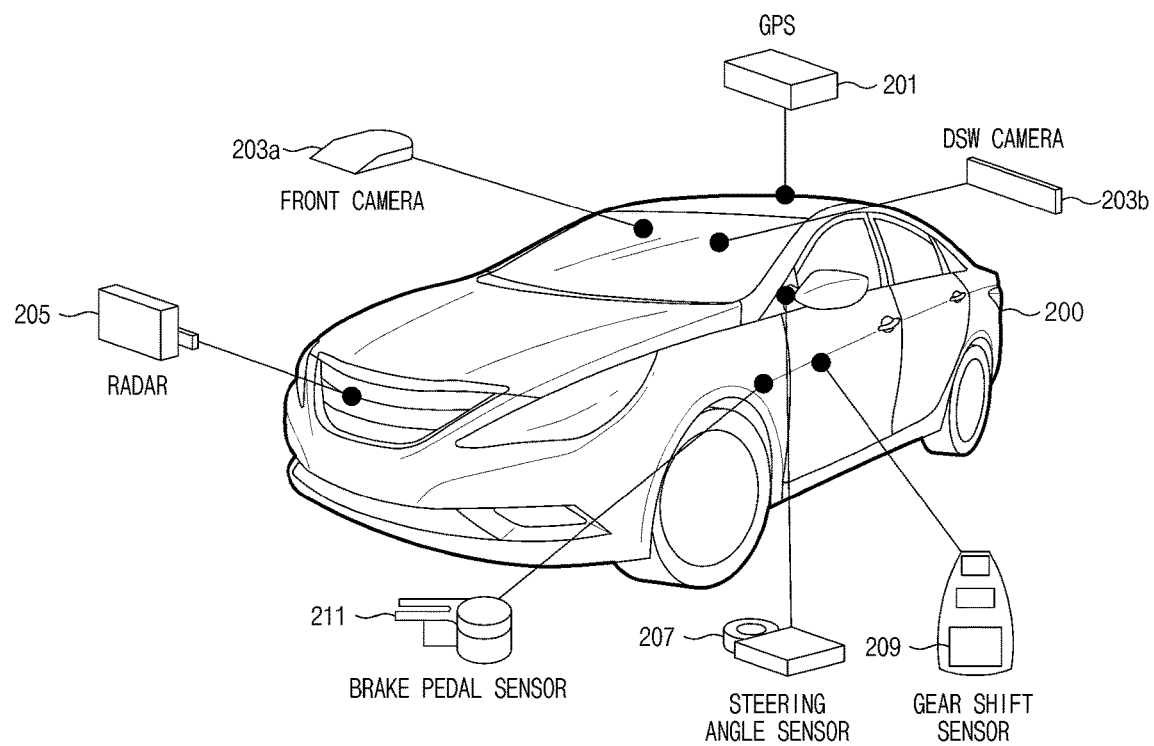

FIG. 2 is a diagram illustrating a method of collecting data and controlling a vehicle during parking in a vehicle parking control device and method according to an exemplary embodiment of the present disclosure.

Referring to FIG. 2, in a vehicle parking control device and method according to an exemplary embodiment of the present disclosure, the processor may recognize a state of a vehicle 200 (S210).

According to an exemplary embodiment of the present disclosure, the processor may obtain vehicle data from the data collection module.

According to an exemplary embodiment of the present disclosure, the processor may recognize that the vehicle 200 enters a parking lot based on the location information of the vehicle 200 obtained from a Global Positioning System (GPS) 201. According to an exemplary embodiment of the present disclosure, the processor is configured to determine whether the vehicle 200 is located in the parking lot based on the location information of the vehicle 200 obtained from the GPS 201. For example, the parking lot may include at least one of an in-building parking lot, an on-street parking lot, and an off-street parking lot.

According to an exemplary embodiment of the present disclosure, the processor may detect a nearby vehicle based on an image obtained from a front camera 203a among cameras 203.

According to an exemplary embodiment of the present disclosure, the processor is configured to determine a state of the nearby vehicle based on an image obtained from the front camera 203a among the cameras 203. According to an exemplary embodiment of the present disclosure, the processor may detect a parking line based on an image obtained from the front camera 203a among the cameras 203.

According to an exemplary embodiment of the present disclosure, the processor is configured to determine a gaze state of a driver based on an image obtained from a DSW camera 203b among the cameras 203.

According to an exemplary embodiment of the present disclosure, the DSW camera 203b may capture an image of the driver.

According to an exemplary embodiment of the present disclosure, the processor may detect (or determine) the driver's face, gaze direction, eye closing time, or the like from a driver image, which is obtained from the DSW camera 203b. For example, the processor is configured to determine whether the driver's eyes are directed toward the front, toward the rear, or toward the side.

According to an exemplary embodiment of the present disclosure, the processor may detect the presence or absence of a surrounding object based on information obtained from a radar 205.

According to an exemplary embodiment of the present disclosure, the radar 205 may measure a distance between the vehicle 200 and a surrounding object. According to an exemplary embodiment of the present disclosure, the radar 205 may generate electromagnetic waves to the surroundings, receive electromagnetic waves reflected from the surrounding object, and identify a distance, a direction, an altitude, or the like with respect to the surrounding object. For example, the surrounding object may include nearby vehicles or pedestrians.

According to an exemplary embodiment of the present disclosure, the processor is configured to determine whether steering is operated based on steering angle information obtained from a steering angle sensor 207.

For example, the processor is configured to determine whether steering is operated for parallel parking or reverse parking based on the steering angle information.

According to an exemplary embodiment of the present disclosure, the processor is configured to determine a forward/reverse state of the vehicle 200 based on gear shifting information obtained from a gear shifting sensor 209.

For example, the processor is configured to determine that the vehicle 200 is driving forward when a gear is in the drive (D) position based on the gear shifting information. For another example, the processor is configured to determine that the vehicle 200 is driving reverse when the gear is in the reverse (R) position based on the gear shifting information.

According to an exemplary embodiment of the present disclosure, the processor is configured to determine whether the vehicle 200 is in a stopped state based on brake information obtained from a brake pedal sensor 211.

According to an exemplary embodiment of the present disclosure, the processor is configured to determine whether the vehicle 200 is in a stopped state for parking based on the brake information.

According to an exemplary embodiment of the present disclosure, the processor is configured to determine a parking circumstance or the driver's intention (S220).

According to an exemplary embodiment of the present disclosure, the processor is configured to determine the parking circumstance based on vehicle data obtained from the data collection module.

For example, the processor is configured to determine whether the vehicle 200 enters a parking lot or is located in the parking lot, based on location information of the vehicle 200 included in the vehicle data.

For example, the processor is configured to determine whether another vehicle is parked around the vehicle 200 or whether there is a parking line based on the vehicle data obtained from the data collection module.

According to an exemplary embodiment of the present disclosure, the processor is configured to determine the driver's intention based on vehicle data obtained from the data collection module.

For example, the processor may detect the driver's gaze direction based on a driver image obtained from the DSW camera 203b.

For example, when it is determined that the driver's gaze direction is a forward direction, the processor is configured to determine that the driver intends to move the vehicle 200 forward thereof.

Also, for example, when it is determined that the driver's gaze direction is a rearward direction or a sideward direction, the processor is configured to determine that the driver intends to move the vehicle 200 rearward.

According to an exemplary embodiment of the present disclosure, the processor may control the vehicle in a parking circumstance (S230).

According to an exemplary embodiment of the present disclosure, when it is determined that the vehicle 200 is in a parked state, the processor may control the vehicle.

According to an exemplary embodiment of the present disclosure, when it is determined that the vehicle 200 is in a parked state based on the vehicle data obtained from the data collection module, the processor may control the vehicle through an engine management system (EMS), a hybrid control unit (HCU), and/or a transmission control unit (TCU).

According to an exemplary embodiment of the present disclosure, the EMS may control the operation of an engine and manage the engine. For example, the EMS may perform engine torque control, fuel efficiency control, engine failure diagnosis, generator control, and/or the like.

According to an exemplary embodiment of the present disclosure, the TCU may control the operation of a transmission in response to a shift command through a shift lever or a driving speed of the vehicle 200. For example, the TCU may perform clutch control, shift control, engine torque control during shift, and/or the like.

For example, when it is determined that the vehicle 200 is in a parked state and it is determined that the driver's intention does not match the forward/reverse state of the vehicle 200, the processor may shift the gear to the "N" (neutral) position Also, for example, when it is determined that the vehicle 200 is in a parked state, the processor may automatically deactivate an auto vehicle hold (AVH) function or an idle stop and go (ISG) function.

Figure 3:
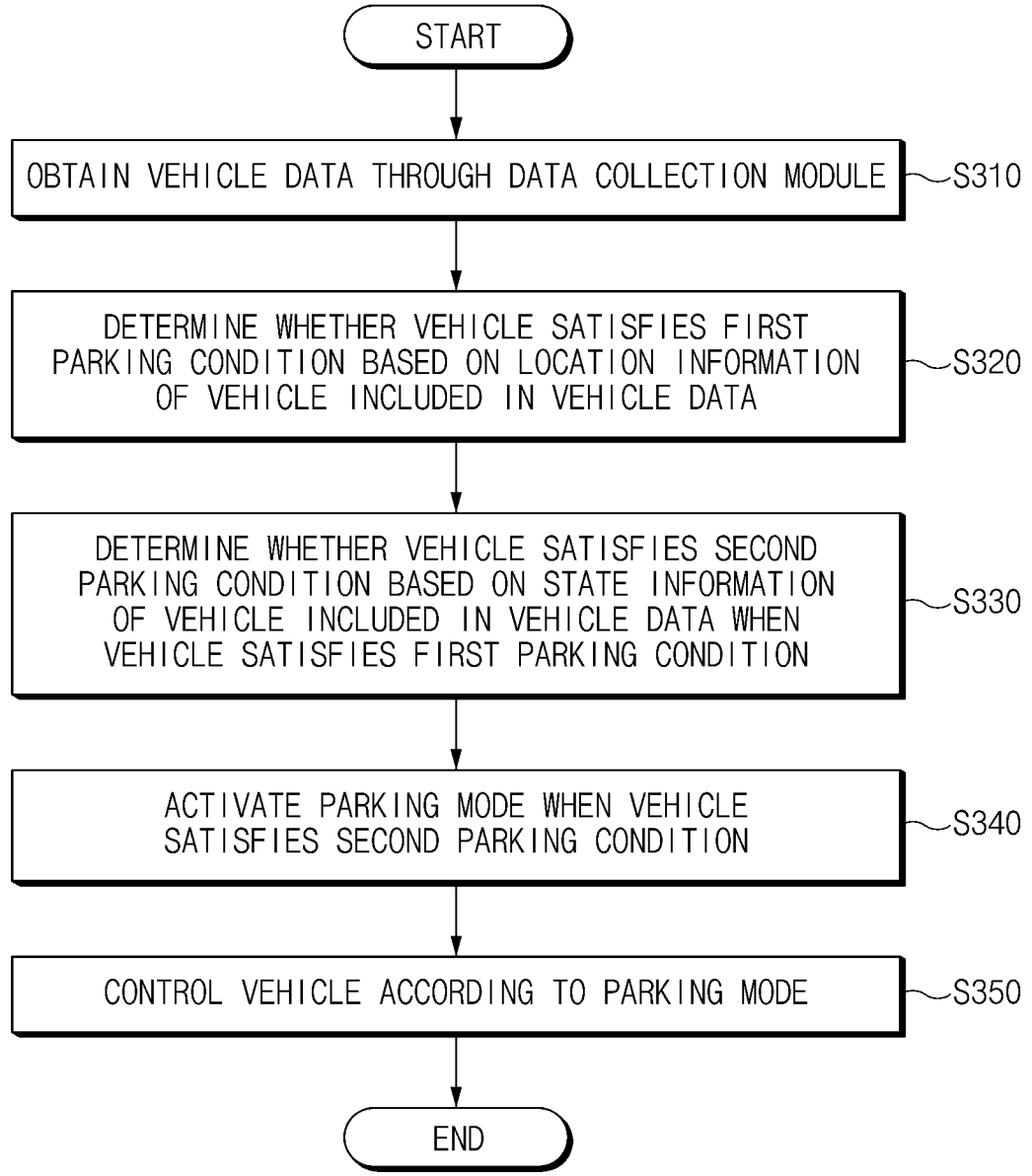
FIG. 3 is a flowchart illustrating a vehicle parking control method according to an exemplary embodiment of the present disclosure.

FIG. 3 is a flowchart illustrating a vehicle parking control method according to an exemplary embodiment of the present disclosure. In the following embodiment, operations S310 to S350 may be sequentially performed, but are not necessarily performed sequentially. For example, the order of the operations may be changed, and at least two operations may be performed in parallel.

Content that corresponds to or overlaps the description with reference to FIG. 3 will be briefly described or omitted.

Referring to FIG. 3, in a vehicle parking control device and method according to an exemplary embodiment of the present disclosure, the processor may obtain vehicle data through a data collection module (S310).

For example, the processor may obtain location information of a vehicle from a global positioning system (GPS). Also, for example, the processor may obtain information related to nearby vehicles or parking lines from a front camera. Also, for example, the processor may obtain a driver gaze information from a driver state warning (DSW) camera. Also, for example, the processor may obtain information related to a surrounding object from a radar. Also, for example, the processor may obtain steering angle information of the vehicle from a steering angle sensor. Also, for example, the processor may obtain gear shifting information from a shift sensor. Also, for example, the processor may obtain vehicle stop state information through a brake pedal sensor.

According to an exemplary embodiment of the present disclosure, the processor is configured to determine whether the vehicle satisfies a first parking condition, based on the location information of the vehicle included in the vehicle data (S320). Hereinafter, the first parking condition may be referred to as a parking mode precondition.

According to an exemplary embodiment of the present disclosure, the processor is configured to determine whether the vehicle is entering a parking lot or is located in the parking lot, based on the vehicle location information obtained from the GPS.

According to an exemplary embodiment of the present disclosure, the processor is configured to conclude that the vehicle satisfies the first parking condition when it is determined that the vehicle is entering the parking lot or is located in the parking lot based on the location information of the vehicle.

According to an exemplary embodiment of the present disclosure, when the vehicle is entering the parking lot or is located in the parking lot, the processor is configured to determine whether another vehicle has parked nearby or whether there is a parking line, based on information obtained from a front camera or radar.

According to an exemplary embodiment of the present disclosure, the processor is configured to conclude that the vehicle satisfies the first parking condition when it is determined that the other vehicle has been parked nearby or that there is the parking line, based on the information obtained from the front camera or radar.

According to an exemplary embodiment of the present disclosure, the processor is configured to determine whether the vehicle satisfies a second parking condition, based on the state information of the vehicle included in the vehicle data when the vehicle satisfies the first parking condition (S330).

According to an exemplary embodiment of the present disclosure, when the vehicle satisfies the first parking condition, the processor is configured to determine whether the vehicle satisfies the second parking condition based on at least one of steering angle information, brake information, and gear shifting information.

According to an exemplary embodiment of the present disclosure, the processor is configured to determine that the second parking condition is satisfied when a steering angle sensor value included in the steering angle information is greater than or equal to a first threshold value.

According to an exemplary embodiment of the present disclosure, when a brake pedal sensor value included in the brake information is greater than or equal to a second threshold value, the processor is configured to determine that the second parking condition is satisfied.

According to an exemplary embodiment of the present disclosure, when it is determined that a gear shifter position is changed based on the gear shifting information, the processor is configured to determine that the second parking condition is satisfied.

According to an exemplary embodiment of the present disclosure, when the vehicle satisfies the second parking condition, the processor may activate a parking mode (S340).

According to an exemplary embodiment of the present disclosure, the processor may activate a parking mode when the steering angle sensor value included in the steering angle information is greater than or equal to a first threshold value, the brake pedal sensor value included in the brake information is greater than or equal to a second threshold value, or when it is determined that the gear shifter position is changed.

According to an exemplary embodiment of the present disclosure, the processor may control the vehicle according to the parking mode (S350).

According to an exemplary embodiment of the present disclosure, the processor may shift the gear to a neutral (N) position based on the driver gaze information and gear shifting information, when it is determined that the driver's gaze is a forward direction and the gear is set in succession to the "R" (reverse) position while the parking mode is activated.

According to an exemplary embodiment of the present disclosure, the processor may shift the gear to a neutral (N) position based on the driver gaze information and gear shifting information, when it is determined that the driver's gaze direction is a rearward direction and the gear is set in succession to the "D" (drive) position while the parking mode is activated.

According to an exemplary embodiment of the present disclosure, the processor may automatically release an auto vehicle hold (AVH) function or an idle stop and go (ISG) function while the parking mode is activated.

Figure 4A:
FIG. 4A and FIG. 4B illustrate various exemplary embodiments of determining the location of a vehicle in a vehicle parking control device and method according to an exemplary embodiment of the present disclosure.
Figure 4B:
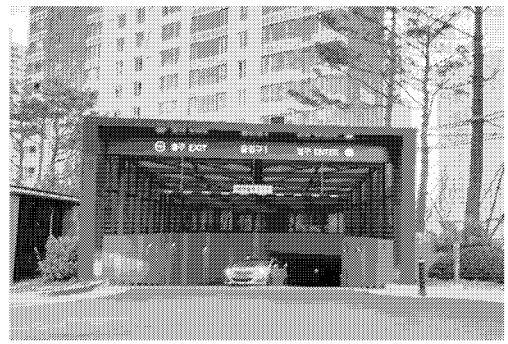

FIG. 4A and FIG. 4B illustrate various exemplary embodiments of determining the location of a vehicle in a vehicle parking control device and method according to an exemplary embodiment of the present disclosure.

Referring to FIG. 4A and FIG. 4B, in a vehicle parking control device and method according to an exemplary embodiment of the present disclosure, a processor may identify that a vehicle enters a parking lot in a building.

FIG. 4A shows a parking tower, and FIG. 4B shows an underground parking lot.

According to an exemplary embodiment of the present disclosure, the processor is configured to determine the location of the vehicle based on vehicle data obtained through a data collection module.

According to an exemplary embodiment of the present disclosure, the processor is configured to determine whether the vehicle is entering a parking lot (e.g., a parking tower or an underground parking lot) based on location information of the vehicle obtained from a GPS.

According to an exemplary embodiment of the present disclosure, when it is determined that the vehicle is entering the parking lot, the processor is configured to conclude that the vehicle satisfies a parking mode precondition.

According to an exemplary embodiment of the present disclosure, when it is not determined that the vehicle is entering the parking lot, the processor is configured to determine that the vehicle does not satisfy a parking mode precondition.

According to an exemplary embodiment of the present disclosure, the processor is configured to determine whether another vehicle has parked nearby or whether there is a parking line, based on information obtained from a front camera or radar.

According to an exemplary embodiment of the present disclosure, the processor is configured to conclude that the vehicle satisfies the parking mode precondition when it is determined that the other vehicle has been parked nearby or that there is the parking line, based on the information obtained from the front camera or radar.

According to an exemplary embodiment of the present disclosure, the processor is configured to determine that the vehicle does not satisfy the parking mode precondition when it is determined that another vehicle is not parked nearby and there is no parking line based on the information obtained from the front camera or radar.

Figure 5A:
FIG. 5A and FIG. 5B illustrate various exemplary embodiments of determining the location of a vehicle in a vehicle parking control device and method according to an exemplary embodiment of the present disclosure.
Figure 5B:
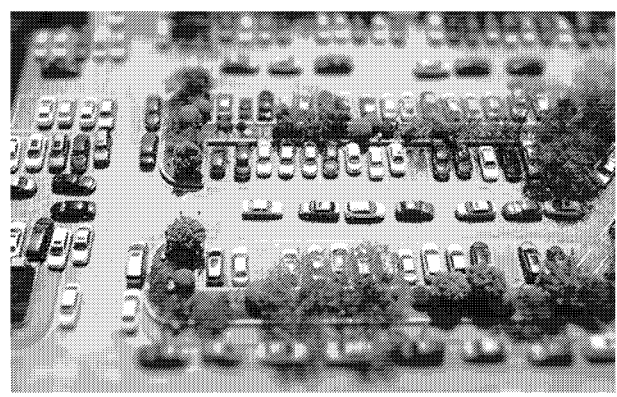

FIG. 5A and FIG. 5B illustrate various exemplary embodiments of determining the location of a vehicle in a vehicle parking control device and method according to an exemplary embodiment of the present disclosure.

Referring to FIGS. 5A and 5B, in a vehicle parking control device and method according to an exemplary embodiment of the present disclosure, a processor may identify that a vehicle is entering a parking lot. FIG. 5A and FIG. 5B show an off-street parking lot.

According to an exemplary embodiment of the present disclosure, the processor is configured to determine the location of the vehicle based on vehicle data obtained through a data collection module.

According to an exemplary embodiment of the present disclosure, the processor is configured to determine whether the vehicle is entering a parking lot (e.g., the off-street parking lot) based on location information of the vehicle obtained from a GPS.

According to an exemplary embodiment of the present disclosure, when it is determined that the vehicle is entering the parking lot, the processor is configured to conclude that the vehicle satisfies a parking mode precondition.

According to an exemplary embodiment of the present disclosure, when it is not determined that the vehicle is entering the parking lot, the processor is configured to determine that the vehicle dissatisfies a parking mode precondition.

According to an exemplary embodiment of the present disclosure, the processor is configured to determine whether another vehicle has parked nearby or whether there is a parking line, based on information obtained from a front camera or radar.

According to an exemplary embodiment of the present disclosure, the processor is configured to conclude that the vehicle satisfies the parking mode precondition when it is determined that the other vehicle has been parked nearby or that there is the parking line, based on the information obtained from the front camera or radar.

According to an exemplary embodiment of the present disclosure, the processor is configured to determine that the vehicle does not satisfy the parking mode precondition when it is determined that another vehicle is not parked nearby and there is no parking line based on the information obtained from the front camera or radar.

Figure 6A:
FIG. 6A and FIG. 6B illustrate various exemplary embodiments of determining the location of a vehicle in a vehicle parking control device and method according to an exemplary embodiment of the present disclosure.
Figure 6B:
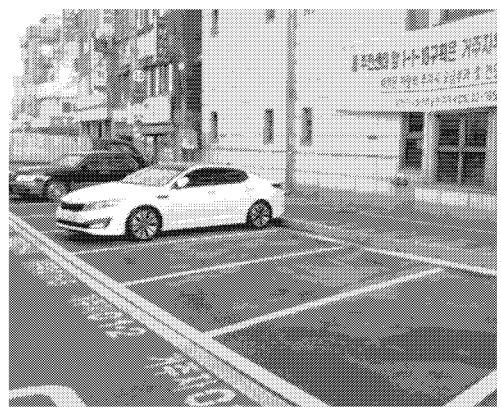

FIG. 6A and FIG. 6B illustrate various exemplary embodiments of determining the location of a vehicle in a vehicle parking control device and method according to an exemplary embodiment of the present disclosure.

Referring to FIG. 6A and FIG. 6B, in a vehicle parking control device and method according to an exemplary embodiment of the present disclosure, a processor is configured to determine whether there is another vehicle around a parking lot. FIGS. 6A and 6B show an on-street parking lot.

According to an exemplary embodiment of the present disclosure, the processor is configured to determine the location of the vehicle based on vehicle data obtained through a data collection module.

According to an exemplary embodiment of the present disclosure, the processor is configured to determine whether the vehicle is entering a parking lot (e.g., the on-street parking lot) based on location information of the vehicle obtained from a GPS.

According to an exemplary embodiment of the present disclosure, when it is determined that the vehicle is located around or in a parking lot, the processor is configured to conclude that the vehicle satisfies a parking mode precondition.

According to an exemplary embodiment of the present disclosure, when it is not determined that the vehicle is located around or in a parking lot, the processor is configured to determine that the vehicle does not satisfy a parking mode precondition.

According to an exemplary embodiment of the present disclosure, the processor is configured to determine whether another vehicle has parked nearby or whether there is a parking line, based on information obtained from a front camera or radar.

According to an exemplary embodiment of the present disclosure, the processor is configured to determine whether a nearby vehicle is in a moving state based on information obtained through a front camera. For example, the processor is configured to determine whether the nearby vehicle is in a driving state or a stopped state.

According to an exemplary embodiment of the present disclosure, the processor is configured to conclude that the vehicle satisfies the parking mode precondition when it is determined that the other vehicle has been parked nearby or that there is the parking line, based on the information obtained from the front camera or radar.

According to an exemplary embodiment of the present disclosure, the processor is configured to determine that the vehicle does not satisfy the parking mode precondition when it is determined that another vehicle is not parked nearby and there is no parking line based on the information obtained from the front camera or radar.

According to an exemplary embodiment of the present disclosure, when it is determined that the moving state of the nearby vehicle is similar to the moving state of a host vehicle based on the information obtained through the front camera, the processor is configured to determine that the host vehicle satisfies a parking mode precondition.

According to an exemplary embodiment of the present disclosure, when it is determined that the moving state of the nearby vehicle is similar to the moving state of the host vehicle while the host vehicle is stopped, the processor is configured to conclude that the vehicle satisfies the parking mode precondition. For example, when the nearby vehicle is in a stopped state and the host vehicle is in a stopped state, the processor is configured to determine that the host vehicle satisfies the parking mode precondition.

According to an exemplary embodiment of the present disclosure, when it is determined that the moving state of the nearby vehicle is contrary to the moving state of a host vehicle based on the information obtained through the front camera, the processor is configured to determine that the host vehicle does not satisfy the parking mode precondition.

According to an exemplary embodiment of the present disclosure, when it is determined that the moving state of the nearby vehicle is contrary to the moving state of the host vehicle while the host vehicle is stopped, the processor is configured to conclude that the vehicle satisfies a parking mode precondition. For example, when the host vehicle is in a stopped state and a nearby vehicle is in a driving state, the processor is configured to determine that the host vehicle does not satisfy the parking mode precondition.

Figure 7:
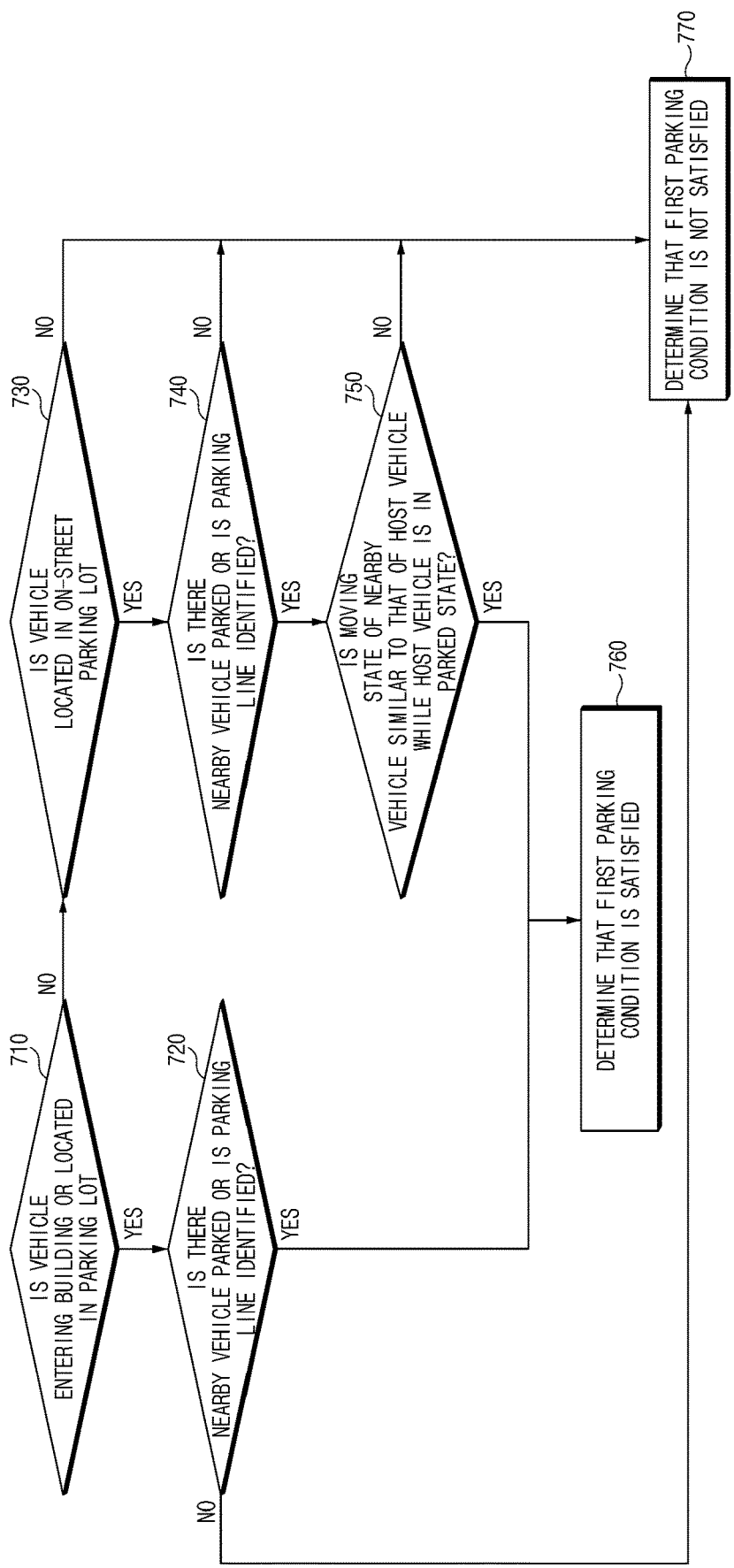
FIG. 7 is a flowchart illustrating a method of determining whether a first parking condition is satisfied for each location of a vehicle in a vehicle parking control device and method according to an exemplary embodiment of the present disclosure.

FIG. 7 is a flowchart illustrating a method of determining whether a first parking condition is satisfied for each location of a vehicle in a vehicle parking control device and method according to an exemplary embodiment of the present disclosure. In the following embodiment, operations S710 to S770 may be sequentially performed, but are not necessarily performed sequentially. For example, the order of the operations may be changed, and at least two operations may be performed in parallel.

Referring to FIG. 7, in a vehicle parking control device and method according to an exemplary embodiment of the present disclosure, the processor is configured to determine whether the vehicle is located in a building entrance location or an off-street parking lot (S710).

According to an exemplary embodiment of the present disclosure, the processor is configured to determine whether the vehicle is entering a building parking lot or an off-street parking lot based on location information of the vehicle obtained from the GPS.

According to an exemplary embodiment of the present disclosure, the processor is configured to determine whether the vehicle is located in the building parking lot or the off-street parking lot based on location information of the vehicle obtained from the GPS.

According to an exemplary embodiment of the present disclosure, when it is determined that the vehicle is located in the building entrance location or the off-street parking lot (Yes of S710), the processor is configured to determine whether another vehicle is parked nearby or there is a parking line (S720).

According to an exemplary embodiment of the present disclosure, when it is determined that the vehicle is located in the building parking lot or the off-street parking lot, the processor is configured to determine whether at least one other vehicle is parked nearby or whether there is a parking line, through a front camera or radar.

According to an exemplary embodiment of the present disclosure, when another vehicle is parked nearby or a parking line is identified (Yes in S720), the processor is configured to conclude that the vehicle satisfies a first parking condition (S760).

According to an exemplary embodiment of the present disclosure, the processor is configured to conclude that the vehicle satisfies the first parking condition when another vehicle is parked nearby or a parking line is identified.

According to an exemplary embodiment of the present disclosure, when another vehicle is not parked nearby or a parking line is not identified (No in S720), the processor is configured to determine that the vehicle does not satisfy the first parking condition (S770).

According to an exemplary embodiment of the present disclosure, when it is determined that the vehicle is not located in building entrance location or the off-street parking lot (No of S710), the processor is configured to determine whether the vehicle is located in an on-street parking lot (S730).

According to an exemplary embodiment of the present disclosure, the processor is configured to determine whether the vehicle is located around or in the on-street parking lot based on location information of the vehicle obtained from the GPS.

According to an exemplary embodiment of the present disclosure, when it is determined that the vehicle is located in the on-street parking lot (Yes of S730), the processor is configured to determine whether another vehicle is parked nearby or there is a parking line (S740).

According to an exemplary embodiment of the present disclosure, when it is determined that the vehicle is located in the on-street parking lot, the processor is configured to determine whether at least one other vehicle is parked nearby or whether there is a parking line, through a front camera or radar.

According to an exemplary embodiment of the present disclosure, when it is not determined that the vehicle is located in the on-street parking lot (No in S730), the processor is configured to determine that the first parking condition is not satisfied (S770).

According to an exemplary embodiment of the present disclosure, when another vehicle is parked nearby or the parking line is identified (Yes in S740), the processor is configured to determine whether the moving state of the nearby vehicle is similar to the moving state of the host vehicle (S750).

According to an exemplary embodiment of the present disclosure, the processor is configured to determine whether the nearby vehicle is in a driving state or a stopped state, based on information obtained through the front camera, to determine whether the moving state of the host vehicle is similar to that of the nearby vehicle.

According to an exemplary embodiment of the present disclosure, when another vehicle is parked nearby or a parking line is not identified (No in S740), the processor is configured to determine that the vehicle does not satisfy the first parking condition (S770).

According to an exemplary embodiment of the present disclosure, when it is determined that the moving state of the surrounding vehicle is similar to the moving state of the host vehicle while the host vehicle is stopped (Yes in S750), the processor is configured to determine that the first parking condition is satisfied (S760).

According to an exemplary embodiment of the present disclosure, the processor is configured to conclude that the vehicle satisfies the first parking condition when the nearby vehicle is in a stopped state while the host vehicle is in a stopped vehicle.

According to an exemplary embodiment of the present disclosure, when it is not determined that the moving state of the surrounding vehicle is similar to the moving state of the host vehicle while the host vehicle is stopped (No in S750), the processor is configured to determine that the first parking condition is not satisfied (S770).

According to an exemplary embodiment of the present disclosure, the processor is configured to determine that the vehicle does not satisfy the first parking condition when the nearby vehicle is in a driving state while the host vehicle is in a stopped sate.

Figure 8A:
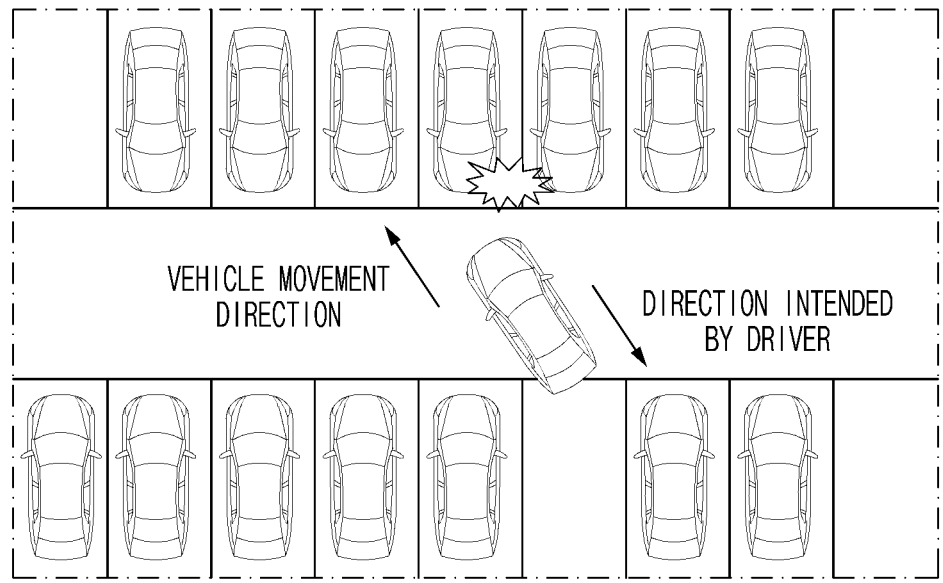
FIG. 8A and FIG. 8B are diagrams illustrating a method of controlling a vehicle according to a driver's intension in a vehicle parking control device and method according to an exemplary embodiment of the present disclosure.
Figure 8B:
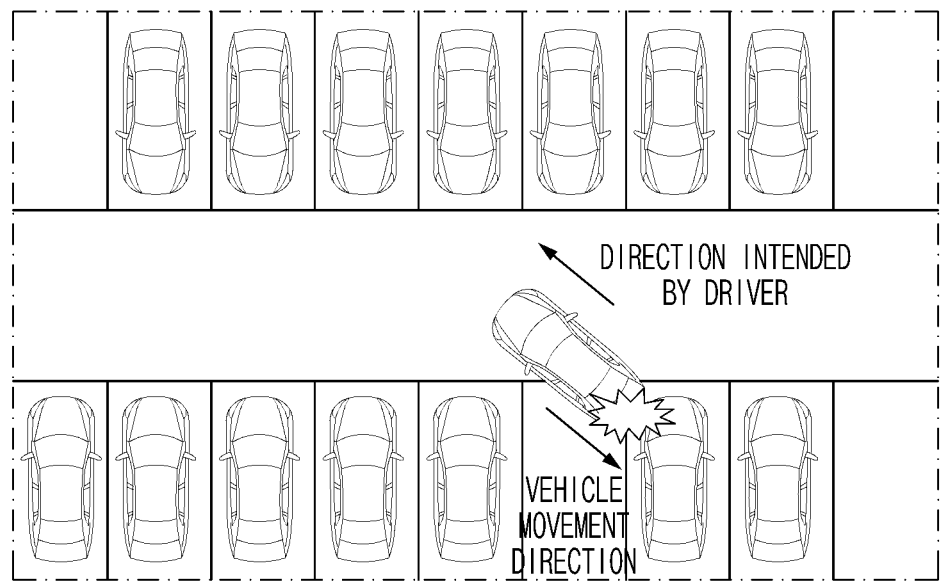

FIG. 8A and FIG. 8B are diagrams illustrating a method of controlling a vehicle according to a driver's intension in a vehicle parking control device and method according to an exemplary embodiment of the present disclosure. Content that corresponds to or overlaps the description with reference to contents of FIGS. 8A and 8B will be briefly described or omitted.

Referring to FIG. 8A, when it is determined that the vehicle satisfies a parking mode precondition, the processor is configured to determine a state of the vehicle.

According to an exemplary embodiment of the present disclosure, the processor may activate the parking mode when it is determined that the vehicle is in a parked state based on the determination of the vehicle state.

For example, when it is determined that the vehicle is in a parked state based on at least one of steering angle information and brake information, the processor may activate the parking mode.

According to an exemplary embodiment of the present disclosure, the processor is configured to determine a driver's intention. For example, the processor is configured to determine the driver's gaze direction based on image information obtained from a DSW camera.

According to an exemplary embodiment of the present disclosure, the processor is configured to determine the moving direction of the vehicle intended by the driver according to the driver's gaze. For example, when it is determined that the driver's gaze direction is a sideward direction or a rearward direction rather than a forward direction, the processor is configured to determine the moving direction of the vehicle intended by the driver as a first direction (e.g., a rearward direction).

According to an exemplary embodiment of the present disclosure, when detecting an abnormal signal from a gear shifting sensor of the vehicle, the processor may shift the gear to an "N" position according to the parking mode.

For example, when it is determined that the driver's gaze direction is the rearward direction and the gear is set to the "D" position, the processor may shift the gear to the "N" position.

Referring to FIG. 8B, when it is determined that the vehicle satisfies the parking mode precondition, the processor is configured to determine the state of the vehicle.

According to an exemplary embodiment of the present disclosure, the processor may activate the parking mode when it is determined that the vehicle is parked based on the determination of the vehicle state.

For example, when it is determined that the vehicle is in a parked state based on at least one of steering angle information and brake information, the processor may activate the parking mode.

According to an exemplary embodiment of the present disclosure, the processor is configured to determine a driver's intention. For example, the processor is configured to determine the driver's gaze direction based on image information obtained from a DSW camera.

According to an exemplary embodiment of the present disclosure, the processor is configured to determine the moving direction of the vehicle intended by the driver according to the driver's gaze. For example, when it is determined that the driver's gaze direction is a forward direction rather than the sideward direction or rearward direction, the processor is configured to determine the moving direction of the vehicle intended by the driver as a second direction (e.g., a forward direction).

According to an exemplary embodiment of the present disclosure, when detecting an abnormal signal from a gear shifting sensor of the vehicle, the processor may shift the gear to an "N" position according to the parking mode.

For example, when it is determined that the driver's gaze is directed forward and it is determined that the gear is continuously set to the "R" position, the processor may shift the gear to the "N" position.

According to the above-described embodiment, the vehicle parking control device according to the present specification may prevent an accident by restricting the behavior of the vehicle when the gear shifting is performed due to a driver's error when the vehicle is in a parked state.

Figure 9A:
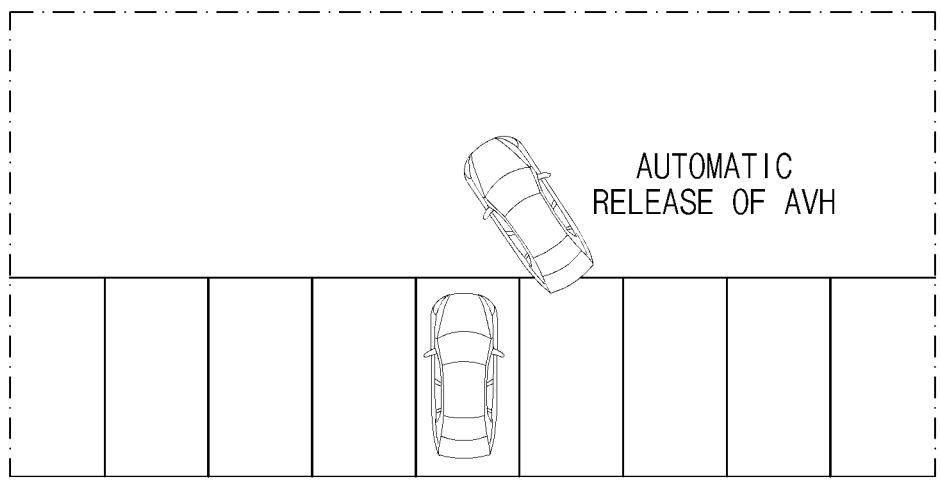
FIG. 9A and FIG. 9B are diagrams illustrating a method of automatically releasing a specific function of a vehicle during parking in a vehicle parking control device and method according to an exemplary embodiment of the present disclosure.
Figure 9B:
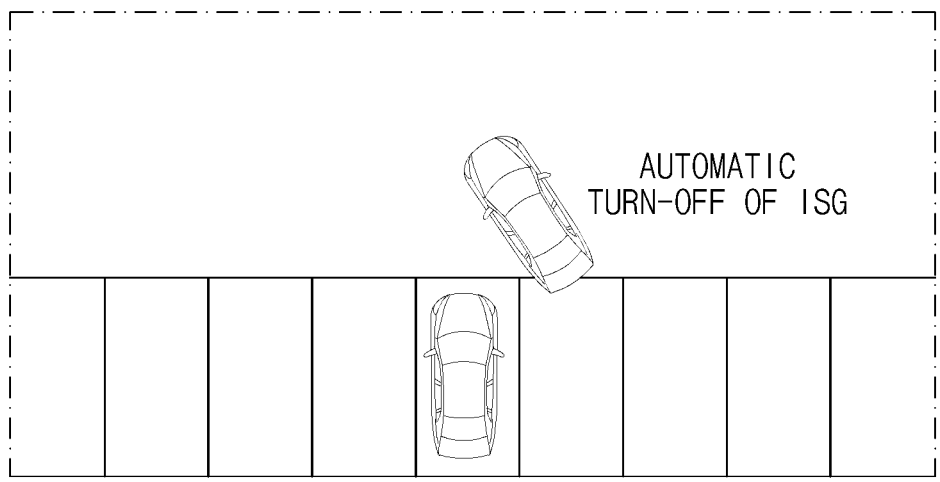

FIG. 9A and FIG. 9B are diagrams illustrating a method of automatically releasing a specific function of a vehicle during parking in a vehicle parking control device and method according to an exemplary embodiment of the present disclosure.

Referring to FIG. 9A, when it is determined that the vehicle satisfies a parking mode precondition, the processor is configured to determine a state of the vehicle.

According to an exemplary embodiment of the present disclosure, the processor may activate the parking mode when it is determined that the vehicle is parked based on the determination of the vehicle state.

For example, when it is determined that the vehicle is in a parked state based on at least one of steering angle information, brake information and gear shifting information, the processor may activate the parking mode.

According to an exemplary embodiment of the present disclosure, the processor may control the EMS, the HCU and/or the TCU according to the parking mode.

According to an exemplary embodiment of the present disclosure, the processor may release (or deactivate) an auto vehicle hold (AVH) function in response to the parking mode being activated.

Referring to FIG. 9B, when it is determined that the vehicle satisfies a parking mode precondition, the processor is configured to determine a state of the vehicle.

According to an exemplary embodiment of the present disclosure, the processor may activate the parking mode when it is determined that the vehicle is parked based on the determination of the vehicle state.

For example, when it is determined that the vehicle is in a parked state based on at least one of steering angle information, brake information and gear shifting information, the processor may activate the parking mode.

According to an exemplary embodiment of the present disclosure, the processor may control the EMS, the HCU and/or the TCU according to the parking mode.

According to an exemplary embodiment of the present disclosure, the processor may release (or deactivate) an idle stop and go (ISG) function in response to the parking mode being activated.

According to the above-described embodiment, when it is determined that the vehicle is in a parked state, the vehicle parking control device according to an exemplary embodiment of the present disclosure may provide convenience to a driver by releasing the AVH and ISG functions without the driver's conscious action.

Figure 10:
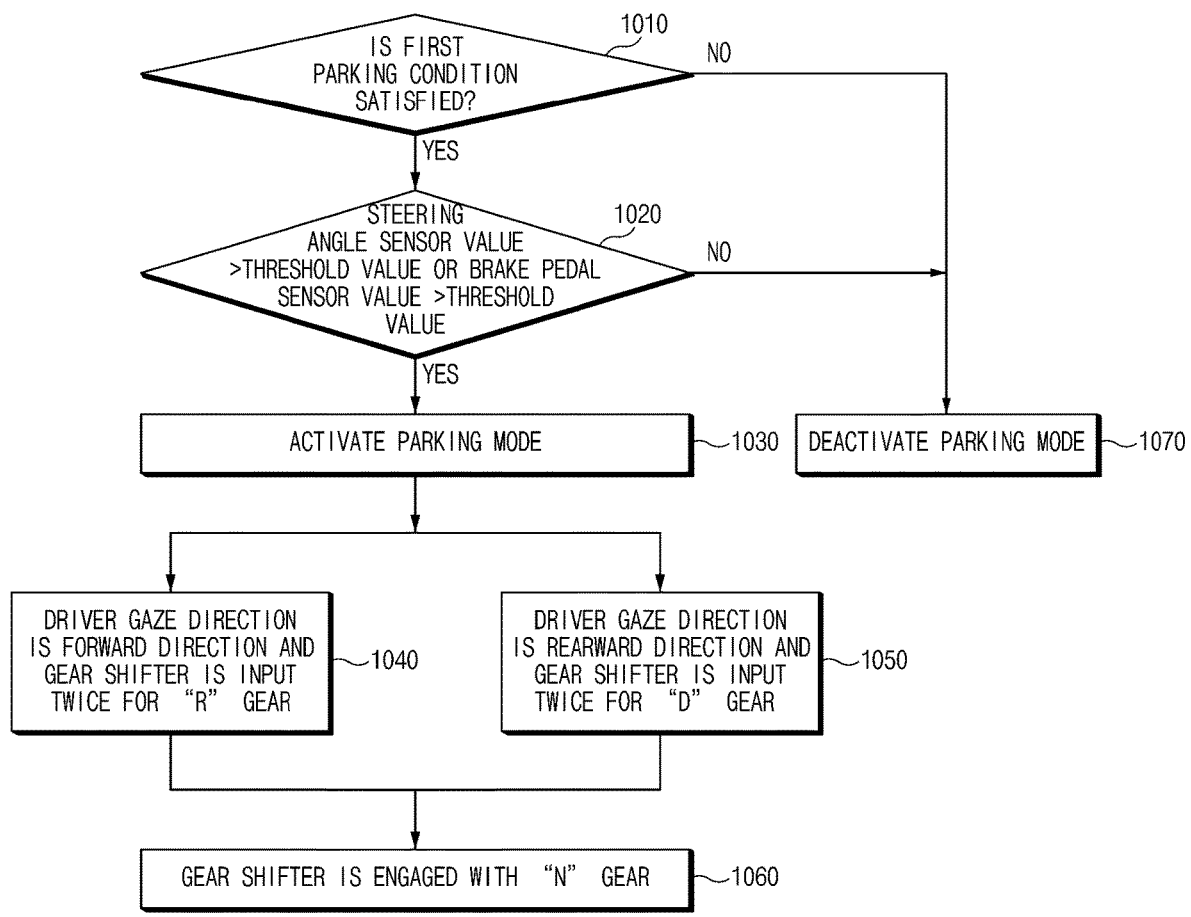
FIG. 10 is a diagram illustrating a method of controlling a vehicle according to a driver's intension by activating a parking mode in a vehicle parking control device and method according to an exemplary embodiment of the present disclosure.

FIG. 10 is a diagram illustrating a method of controlling a vehicle according to a driver's intension by activating a parking mode in a vehicle parking control device and method according to an exemplary embodiment of the present disclosure. In the following embodiment, operations S1010 to S1070 may be sequentially performed, but are not necessarily performed sequentially. For example, the order of the operations may be changed, and at least two operations may be performed in parallel.

Content that corresponds to or overlaps the description with reference to contents of FIG. 10 will be briefly described or omitted.

Referring to FIG. 10, in a vehicle parking control device and method according to an exemplary embodiment of the present disclosure, a processor is configured to determine whether a vehicle satisfies a first parking condition (S1010).

According to an exemplary embodiment of the present disclosure, the processor is configured to determine whether the vehicle satisfies the first parking condition based on vehicle data obtained through a data collection module.

According to an exemplary embodiment of the present disclosure, the processor may identify at least one of at least one other vehicle parked nearby or a parking line in response to determining that the vehicle is entering a parking lot or the vehicle is located in the parking lot, based on location information of the vehicle.

According to an exemplary embodiment of the present disclosure, the processor is configured to conclude that the vehicle satisfies the first parking condition when at least one of at least one other vehicle parked nearby or a parking line is identified.

According to an exemplary embodiment of the present disclosure, when it is determined that the vehicle satisfies the first parking condition (Yes in S1010), the processor is configured to determine whether a steering angle sensor value is greater than a threshold value or a brake pedal sensor value is greater than a threshold value (S1020).

According to an exemplary embodiment of the present disclosure, when it is determined that the vehicle satisfies the first parking condition, the processor is configured to determine whether a steering angle sensor value is greater than a threshold value or a brake pedal sensor value is greater than a threshold value, to determine whether the vehicle is parked.

According to an exemplary embodiment of the present disclosure, when it is not determined that the vehicle satisfies the first parking condition (No in S1010), the processor may deactivate a parking mode (S1070).

According to an exemplary embodiment of the present disclosure, when it is not determined that the vehicle satisfies the first parking condition, the processor may maintain the parking mode in a deactivated state.

According to an exemplary embodiment of the present disclosure, when it is determined that the steering angle sensor value is greater than the threshold value or the brake pedal sensor value is greater than the threshold value (Yes in S1020), the processor may activate the parking mode (S1030).

According to an exemplary embodiment of the present disclosure, when it is determined that the vehicle is in a parked state based on steering angle information or brake information, the processor may activate the parking mode.

According to an exemplary embodiment of the present disclosure, when it is determined that the steering angle sensor value is less than or equal to the threshold value and the brake pedal sensor value is less than or equal to the threshold value (No in S1020), the processor may deactivate the parking mode (S1070).

According to an exemplary embodiment of the present disclosure, when it is determined that the vehicle is not in a parked state based on steering angle information or brake information, the processor may maintain the parking mode in a deactivated state.

According to an exemplary embodiment of the present disclosure, the processor is configured to determine whether the driver's gaze direction is a forward direction and whether the gear shifter is continuously input twice for an "R" gear while the parking mode is activated (S1040).

According to an exemplary embodiment of the present disclosure, the processor is configured to determine a driver's intention. For example, the processor is configured to determine the driver's gaze direction based on image information obtained from a DSW camera.

According to an exemplary embodiment of the present disclosure, the processor is configured to determine the moving direction of the vehicle intended by the driver according to the driver's gaze. For example, when it is determined that the driver's gaze direction is a forward direction rather than the sideward direction or rearward direction, the processor is configured to determine the moving direction of the vehicle intended by the driver as a forward direction thereof.

According to an exemplary embodiment of the present disclosure, the processor may detect an abnormal signal from a gear shifting sensor of the vehicle. For example, the processor is configured to determine that the driver's gaze direction is a forward direction and the gear shifter is continuously input twice for the "R" gear.

According to an exemplary embodiment of the present disclosure, the processor is configured to determine whether the driver's gaze direction is a rearward direction and whether the gear shifter is continuously input twice for a "D" gear while the parking mode is activated (S1050).

According to an exemplary embodiment of the present disclosure, the processor is configured to determine a driver's intention. For example, the processor is configured to determine the driver's gaze direction based on image information obtained from a DSW camera.

According to an exemplary embodiment of the present disclosure, the processor is configured to determine the moving direction of the vehicle intended by the driver according to the driver's gaze. For example, when it is determined that the driver's gaze direction is a sideward direction or a rearward direction rather than a forward direction, the processor is configured to determine the moving direction of the vehicle intended by the driver as a rearward direction thereof.

According to an exemplary embodiment of the present disclosure, the processor may detect an abnormal signal from a gear shifting sensor of the vehicle. For example, the processor is configured to determine that the driver's gaze direction is a rearward direction and the gear shifter is continuously input twice for the "D" gear.

According to an exemplary embodiment of the present disclosure, when it is determined that the driver's gaze direction is a forward direction and the gear shifter is continuously input twice for the "R" gear, and when it is determined that the driver's gaze direction is the rearward direction and the gear shifter is continuously input twice for the "D" gear, the processor may cause the gear shifter to be engaged with the "N" position (1060).

According to an exemplary embodiment of the present disclosure, when it is determined that the driver's intention according to the driver's gaze direction do not match the gear shifting state of the vehicle, the processor may cause the gear shifter to be engaged with the "N" position.

For example, when it is determined that the driver's gaze direction is the forward direction and the gear shifter is continuously input twice for the "R" gear, the processor may cause the gear shifter to be engaged with an "N" gear.

Also, for example, when it is determined that the driver's gaze direction is a rearward direction and the gear shifter is continuously input for the "D" gear, the processor may cause the gear shifter to be engaged with the "N" gear.

Figure 11:
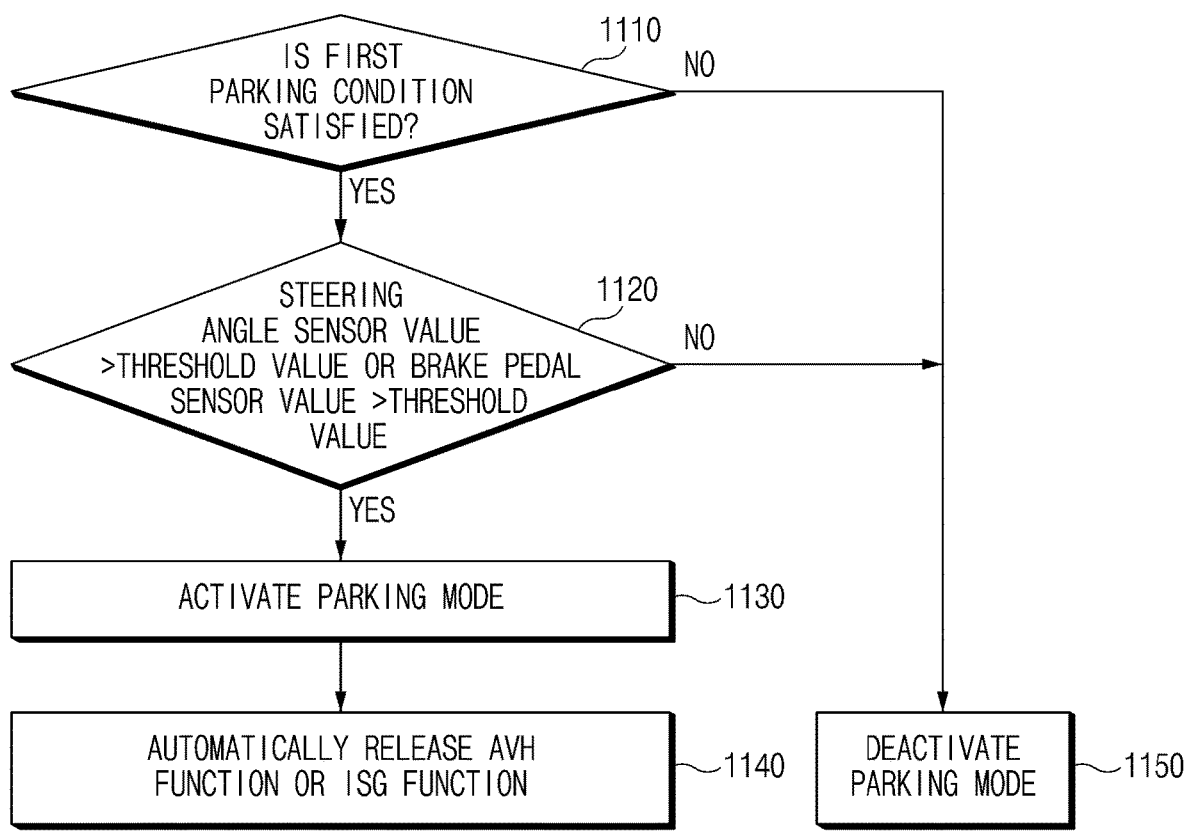
FIG. 11 is a diagram illustrating a method of automatically releasing a specific function by activating a parking mode in a vehicle parking control device and method according to an exemplary embodiment of the present disclosure.

FIG. 11 is a diagram illustrating a method of automatically releasing a specific function by activating a parking mode in a vehicle parking control device and method according to an exemplary embodiment of the present disclosure. In the following embodiment, operations S1110 to S1150 may be sequentially performed, but are not necessarily performed sequentially. For example, the order of the operations may be changed, and at least two operations may be performed in parallel.

Referring to FIG. 11, in a vehicle parking control device and method according to an exemplary embodiment of the present disclosure, a processor is configured to determine whether a vehicle satisfies a first parking condition (S1110).

According to an exemplary embodiment of the present disclosure, the processor is configured to determine whether the vehicle satisfies the first parking condition based on vehicle data obtained through a data collection module.

According to an exemplary embodiment of the present disclosure, the processor may identify at least one of at least one other vehicle parked nearby or a parking line in response to determining that the vehicle is entering a parking lot or the vehicle is located in the parking lot, based on location information of the vehicle.

According to an exemplary embodiment of the present disclosure, the processor is configured to conclude that the vehicle satisfies the first parking condition when at least one of at least one other vehicle parked nearby or a parking line is identified.

According to an exemplary embodiment of the present disclosure, when it is determined that the vehicle satisfies the first parking condition (Yes in S1110), the processor is configured to determine whether a steering angle sensor value is greater than a threshold value or a brake pedal sensor value is greater than a threshold value, or a gear shifter position is changed (S1020).

According to an exemplary embodiment of the present disclosure, when it is determined that the vehicle satisfies the first parking condition, the processor is configured to determine whether a steering angle sensor value is greater than a threshold value or a brake pedal sensor value is greater than a threshold value, or a gear shifter position is changed, to determine whether the vehicle is parked.

According to an exemplary embodiment of the present disclosure, when it is not determined that the vehicle satisfies the first parking condition (No in S1110), the processor may deactivate a parking mode (S1150).

According to an exemplary embodiment of the present disclosure, when it is not determined that the vehicle satisfies the first parking condition, the processor may maintain the parking mode in a deactivated state.

According to an exemplary embodiment of the present disclosure, when it is determined that the steering angle sensor value is greater than a threshold value or the brake pedal sensor value is greater than the threshold value, or the gear shifter position is changed (Yes in S1120), the processor may activate the parking mode (S1130).

According to an exemplary embodiment of the present disclosure, when it is determined that the vehicle is in a parked state based on steering angle information, brake information, or gear shifting information, the processor may activate the parking mode.

According to an exemplary embodiment of the present disclosure, when it is determined that the steering angle sensor value is less than or equal to the threshold value, the brake pedal sensor value is less than or equal to the threshold value, and the gear shifter is not changed (No in S1120), the processor may deactivate the parking mode (S1150).

According to an exemplary embodiment of the present disclosure, when it is not determined that the vehicle is in a parked state based on steering angle information, brake information, or gear shifting information, the processor may maintain the parking mode in a deactivated state.

According to an exemplary embodiment of the present disclosure, the processor may automatically release the AVH function or automatically release the ISG function in response to the parking mode being activated (S1140).

According to an exemplary embodiment of the present disclosure, the processor may control the EMS, the HCU and/or the TCU according to the parking mode.

According to an exemplary embodiment of the present disclosure, the processor may automatically release (or deactivate) the AVH function or automatically release (or deactivate) the ISG function in response to the parking mode being activated.

Figure 12:
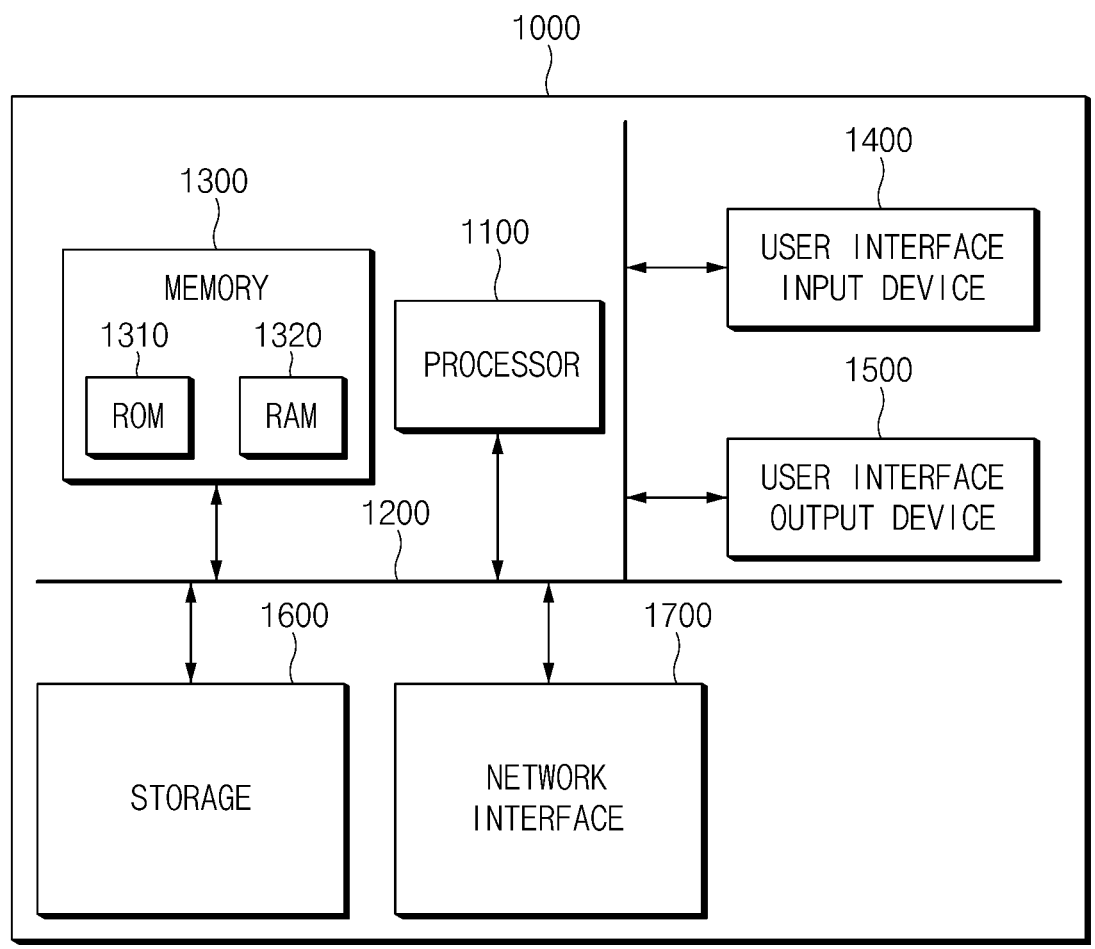
FIG. 12 illustrates a computing system for a vehicle parking control device and method according to an exemplary embodiment of the present disclosure.

FIG. 12 illustrates a computing system for a vehicle parking control device and method according to an exemplary embodiment of the present disclosure.

Referring to FIG. 12, a computing system 1000 for a vehicle parking control device and method may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the exemplary embodiment included in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The effects of the vehicle parking control device and the method thereof according to an exemplary embodiment of the present disclosure are provided as follows.

According to at least one of the exemplary embodiments of the present disclosure, it is possible to reduce costs of the product because accurate route guidance is performed even using a low-cost sensor by use of precise map data.

Furthermore, according to at least one of the exemplary embodiments of the present disclosure, it is possible to perform even the guidance of a parking location according to a final destination, thus improving merchantability.

Furthermore, according to at least one of the exemplary embodiments of the present disclosure, it is possible to effectively perform guidance for a parking lot exit by accurately grasping the location of the vehicle in the parking lot.

Furthermore, various effects may be provided that are directly or indirectly understood through the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle parking control apparatus comprising:
   at least one processor,
   wherein the at least one processor is configured for:
      obtaining vehicle data;
      determining whether a vehicle satisfies a first parking condition based on location information of the vehicle included in the vehicle data;
      determining whether the vehicle satisfies a second parking condition, based on state information of the vehicle included in the vehicle data when the vehicle satisfies the first parking condition;
      activating a parking mode when the vehicle satisfies the second parking condition; and
      controlling the vehicle according to the parking mode, and
   wherein the at least one processor is configured to:
   after the parking mode is activated,
      obtain driver gaze information through a camera;
      obtain gear shifting information from a gear shifting sensor; and
      control the vehicle according to the parking mode based on the driver gaze information and the gear shifting information.

2. The vehicle parking control apparatus of claim 1, wherein the at least one processor is configured to obtain the vehicle data via at least one of a global positioning system (GPS), a front camera, a driver state warning (DSW) camera, a radar, a steering angle sensor, the gear shifting sensor, or a brake pedal sensor.

3. The vehicle parking control apparatus of claim 1, wherein the at least one processor is configured to:
   in response to determining that the vehicle is entering a parking lot or the vehicle is located in the parking lot based on the location information of the vehicle,
   identify at least one of at least one other vehicle parked nearby or a parking line; and
   conclude that the first parking condition is satisfied when the at least one of the at least one other vehicle or the parking line is identified.

4. The vehicle parking control apparatus of claim 1, wherein the at least one processor is configured to:
   in response to determining that the vehicle is located near an on-street parking lot based on the location information of the vehicle,
   identify at least one of at least one other vehicle parked nearby, a parking line, or a moving state of a nearby vehicle; and conclude that the first parking condition is satisfied when at least one of the at least one other vehicle or the parking line is identified and the moving state of the nearby vehicle is similar to a moving state of the vehicle.

5. The vehicle parking control apparatus of claim 1, wherein the state information of the vehicle includes at least one of a steering angle sensor value or a brake sensor value, and
wherein the at least one processor is configured to conclude that the vehicle satisfies the second parking condition when the steering angle sensor value is greater than a first threshold value or when the brake sensor value is greater than a second threshold value while the vehicle satisfies the first parking condition.

6. The vehicle parking control apparatus of claim 1, wherein the at least one processor is configured to shift a gear to a neutral (N) position when the at least one processor concludes that a driver's gaze direction is a forward direction and the gear is set in succession to a reverse (R) position based on the driver gaze information and the gear shifting information.

7. The vehicle parking control apparatus of claim 1, wherein the at least one processor is configured to shift a gear to a neutral (N) position when the at least one processor concludes that a driver's gaze direction is a rearward direction and the gear is set in succession to a drive (D) position based on the driver gaze information and the gear shifting information.

8. The vehicle parking control apparatus of claim 1, wherein the state information of the vehicle includes at least one of a steering angle sensor value, a brake sensor value or the gear shifting information, and
wherein the at least one processor is configured to conclude that the second parking condition is identified when the steering angle sensor value is greater than a first threshold value, when the brake sensor value is greater than a second threshold value, or when a gear shifter position is changed based on the gear shifting information.

9. The vehicle parking control apparatus of claim 7, wherein the at least one processor is configured to automatically release an auto vehicle hold (AVH) function or an idle stop and go (ISG) function according to the parking mode in response to the parking mode being activated when the at least one processor concludes that the vehicle satisfies the second parking condition.

10. A vehicle parking control method comprising:
obtaining, by at least one processor, vehicle data;
determining, by the at least one processor, whether a vehicle satisfies a first parking condition based on location information of the vehicle included in the vehicle data;
determining, by the at least one processor, whether the vehicle satisfies a second parking condition, based on state information of the vehicle included in the vehicle data when the vehicle satisfies the first parking condition;
activating, by the at least one processor, a parking mode when the at least one processor concludes that the vehicle satisfies the second parking condition;
controlling, by the at least one processor, the vehicle according to the parking mode;
obtaining, by the at least one processor, driver gaze information through a camera after the parking mode is activated;
obtaining, by the at least one processor, gear shifting information from a gear shifting sensor; and
controlling, by the at least one processor, the vehicle according to the parking mode based on the driver gaze information and the gear shifting information.

11. The vehicle parking method of controlling claim 10, wherein the obtaining, by the at least one processor, of the vehicle data includes:
obtaining, by the at least one processor, the vehicle data via at least one of a global positioning system (GPS), a front camera, a driver state warning (DSW) camera, a radar, a steering angle sensor, the gear shifting sensor, or a brake pedal sensor.

12. The vehicle parking method of controlling claim 10, wherein the determining of whether the vehicle satisfies the first parking condition includes:
identifying, by the at least one processor, at least one of at least one other vehicle or a parking line in response to determining that the vehicle is entering a parking lot or the vehicle is located in the parking lot, based on the location information of the vehicle; and
concluding that the first parking condition is satisfied when at least one of the at least one other vehicle or the parking line is identified.

13. The vehicle parking method of controlling claim 11, wherein the determining of whether the vehicle satisfies the first parking condition includes:
identifying at least one of at least one other vehicle parked nearby, a parking line, or a moving state of a nearby vehicle, in response to determining that the vehicle is located adjacent to an on-street parking lot based on the location information of the vehicle; and
concluding that the first parking condition is satisfied when at least one of the at least one other vehicle or the parking line is identified and the moving state of the nearby vehicle is similar to a moving state of the vehicle.

14. The vehicle parking method of controlling claim 10, wherein the state information of the vehicle includes at least one of a steering angle sensor value or a brake sensor value, and
wherein the determining of whether the vehicle satisfies the second parking condition includes concluding, by the at least one processor, that the vehicle satisfies the second parking condition when the steering angle sensor value is greater than a first threshold value or when the brake sensor value is greater than a second threshold value while the vehicle satisfies the first parking condition.

15. The vehicle parking method of controlling claim 10, wherein the controlling of the vehicle according to the parking mode includes shifting, by the at least one processor, a gear to a neutral (N) position when the at least one processor concludes that a driver's gaze direction is a forward direction and the gear is set in succession to a reverse (R) position based on the driver gaze information and the gear shifting information.

16. The vehicle parking method of controlling claim 10, wherein the controlling of the vehicle according to the parking mode includes shifting, by the at least one processor, a gear to a neutral (N) position when the at least one processor concludes that a driver's gaze direction is a rearward direction and the gear is set in succession to a drive (D) position based on the driver gaze information and the gear shifting information.

17. The vehicle parking method of controlling claim 10, wherein the state information of the vehicle includes at least one of a steering angle sensor value, a brake sensor value or the gear shifting information and wherein the determining of whether the vehicle satisfies the second parking condition includes concluding, by the at least one processor, that the second parking condition is identified when the steering angle sensor value is greater than a first threshold value, when the brake sensor value is greater than a second threshold value, or when a gear shifter position is changed based on the gear shifting information.

18. The vehicle parking method of controlling claim 17, wherein the controlling of the vehicle according to the parking mode includes automatically releasing, by the at least one processor, an auto vehicle hold (AVH) function or an idle stop and go (ISG) function according to the parking mode in response to the parking mode being activated when the at least one processor concludes that the vehicle satisfies the second parking condition.

* * * * *